(No Model.) 3 Sheets—Sheet 1.

J. J. LINK.
LOCK.

No. 577,962. Patented Mar. 2, 1897.

Witnesses
W. G. Alexander.
E. E. Vernell.

Inventor
John Joseph Link
By Attorneys
Fowler & Fowler (No Model.) 3 Sheets—Sheet 2.

J. J. LINK.
LOCK.

No. 577,962. Patented Mar. 2, 1897.

Witnesses
W. C. Alexander
E. E. Verrell

Inventor
John Joseph Link
By Attorneys
Fowler & Fowler (No Model.)  
3 Sheets—Sheet 3.

J. J. LINK.  
LOCK.

No. 577,962.  
Patented Mar. 2, 1897.

Witnesses  
W. C. Alexander.  
E. E. Vernell.

Inventor  
John Joseph Link  
By Attorney  
Fowler & Fowler

UNITED STATES PATENT OFFICE.

JOHN JOSEPH LINK, OF ST. LOUIS, MISSOURI.

LOCK.

SPECIFICATION forming part of Letters Patent No. 577,962, dated March 2, 1897.

Application filed March 2, 1896. Serial No. 581,576. (No model.)

*To all whom it may concern:*

Be it known that I, JOHN JOSEPH LINK, a citizen of the United States, residing at the city of St. Louis, in the State of Missouri, have invented certain new and useful Improvements in Latch-Locks, of which the following is such a full, clear, and exact description as will enable any one skilled in the art to which it appertains to make and use the same, reference being had to the accompanying drawings, forming part of this specification.

My invention relates to certain new and useful improvements in a latch-lock which is described in Letters Patent No. 549,143, granted to me November 5, 1895.

The object of my invention is to construct the lock with a rectangular bolt such as it is desirable to use on large and heavy doors, to provide means whereby a flat key can be used with this type of lock, to construct a lock having the combined features of a latch-lock and a dead-lock, and also to provide additional devices to prevent the lock from being picked.

My invention consists in providing a non-rotary bolt upon which is carried a rotary member controlling the movement of the said bolt, in providing a suitable rotary cylinder in which the key is inserted, and in various other novel features, all of which are fully described in the following specification and pointed out in the claims affixed hereto.

The accompanying drawings illustrate one form of lock embodying my improvements.

Figure 1:
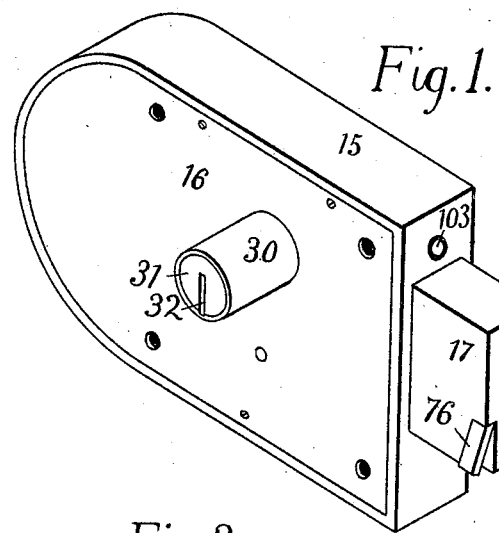
Figure 2:
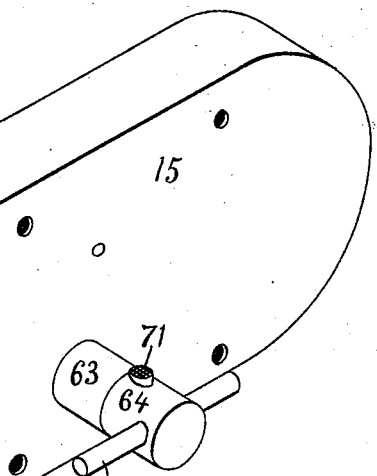
Figure 3:
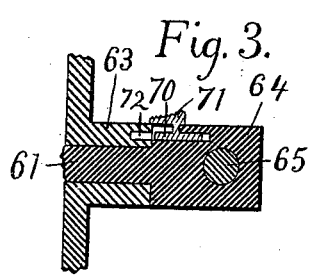
Figure 4:
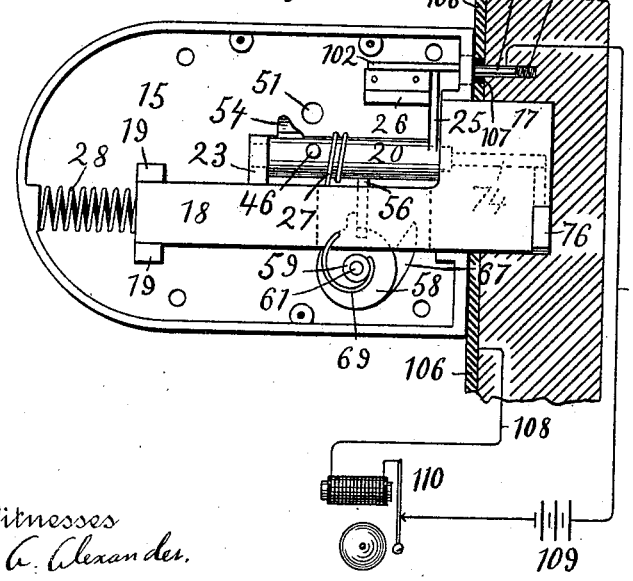
Figure 5:
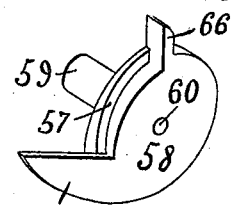
Figure 6:
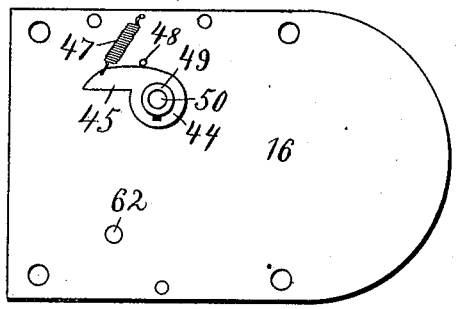
Figure 8:
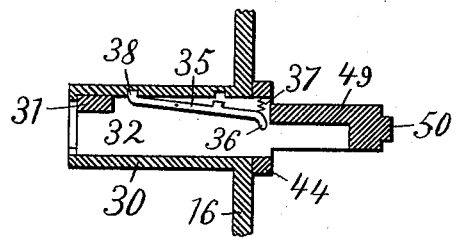
Figure 9:
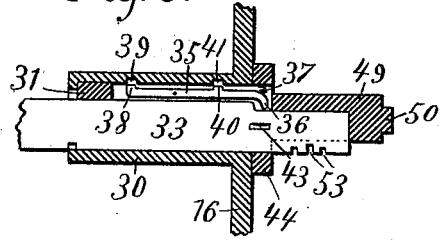
Figure 7:
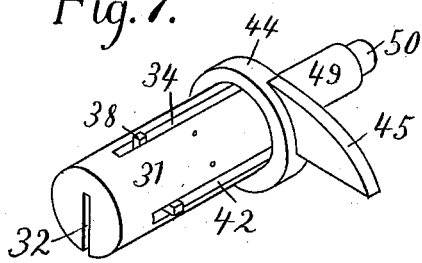
Figure 10:
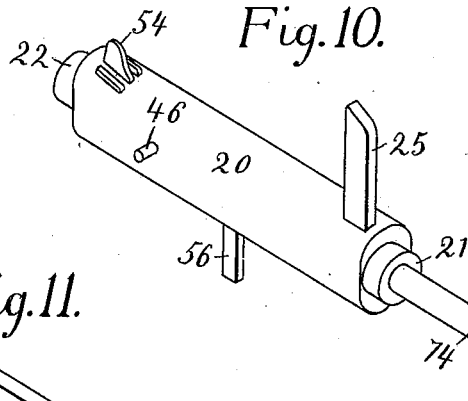
Figure 11:
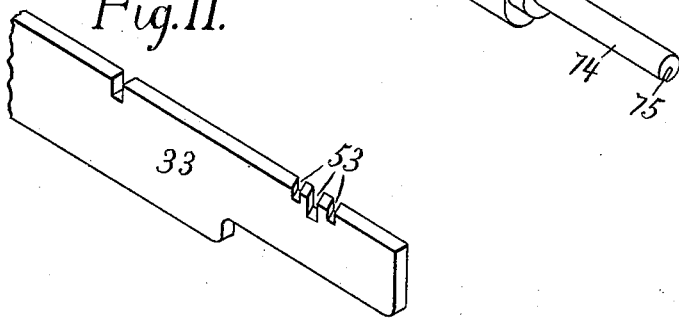
Figure 12:
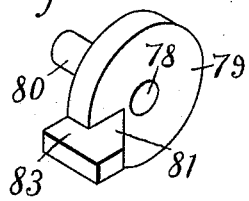
Figure 13:
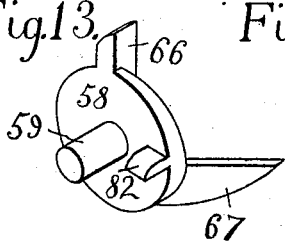
Figure 14:
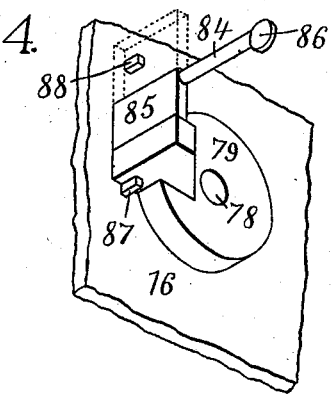
Figure 15:
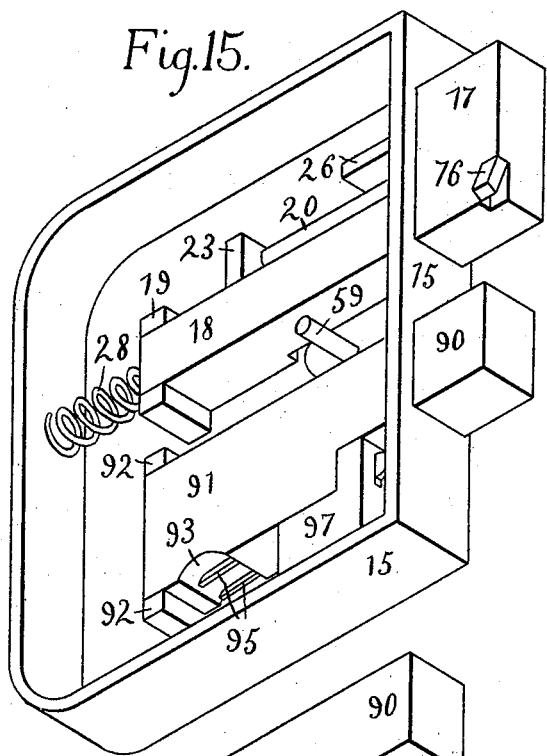
Figure 16:
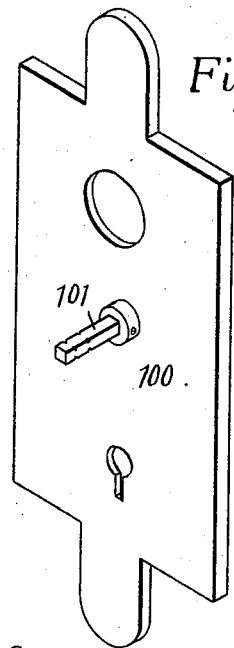
Figure 17:
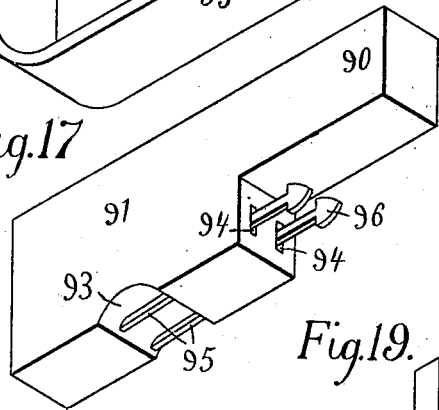
Figure 18:
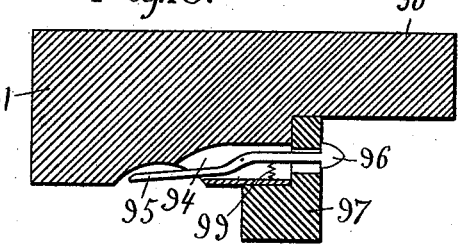
Figure 19:
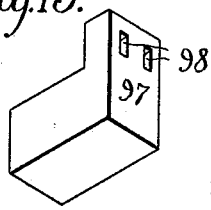

Figures 1 to 14, inclusive, refer to the latch-lock alone, which may be made separate from the dead-lock, if so desired, as shown in these figures. Fig. 1 is an isometric projection of the complete lock. Fig. 2 is a similar view looking at the opposite side of the lock. Fig. 3 is a vertical section through the handle for throwing the bolt from the inside of the door. Fig. 4 is an elevation showing the rear plate removed. Fig. 5 is an isometric projection of a detail. Fig. 6 is an elevation of the rear plate, looking at the inner side of the same. Fig. 7 is an isometric projection of the rotary cylinder in which the key is inserted. Fig. 8 is a vertical section through the same. Fig. 9 is a similar view showing the key in position. Fig. 10 is an isometric projection of the rotary member which is carried by the bolt. Fig. 11 is an isometric projection of the key, the handle being broken away. Figs. 12 and 13 are isometric projections of details. Fig. 14 is an isometric projection showing the device for locking the outer knob. Fig. 15 is an isometric projection showing my complete lock, the back plate being removed. Fig. 16 is an isometric projection of the outer door-plate. Fig. 17 is an isometric projection of the dead-lock bolt. Fig. 18 is a vertical longitudinal section through the same, and Fig. 19 is an isometric projection of a detail.

Like marks of reference refer to similar parts in the several views of the drawings.

15 is the case of the lock and is provided at the side which is placed against the door with a plate 16. This plate 16 is made removable, so as to give access to the interior of the lock.

17 is the bolt, which is provided with a reduced portion 18, that slides between suitable guides 19, secured to the case 15.

The bolt 17 instead of being round, as in the lock described in my previous patent above referred to, is made rectangular, so that it may have the strength required for large and heavy doors, and consequently is non-rotary, but is provided with a rotary part 20, which acts in a manner similar to the rotary bolt in the lock above referred to. The part 20 is preferably either oval, as shown in the drawings, or round. It is provided at each end with a cylindrical projection 21 and 22, one of which is inserted in a suitable opening in the bolt 17 and the other in a part 23, which is secured to the reduced portion 18 of the bolt 17. Carried by the part 20 is a dog 25, which engages with a stop 26 on the case 15, and thus prevents the bolt from being thrown back until the part 20 is rotated sufficiently to disengage the dog from the stop. The dog is kept normally in engagement with the stop by a coil-spring 27, one end of which is secured to the part 20 and the other to the reduced portion 18 of the bolt 17. The bolt 17 is returned to its normal position by the coil-spring 28.

30 is a hollow cylinder which is formed on the plate 16 or secured to it in any suitable manner. Within the cylinder 30 is a rotary cylinder 31, in which is formed a slot 32 for the reception of the key 33. In an upward extension 34 of the slot 32 is pivoted a lever 35. The end of the lever 35 toward the interior of the lock is provided with a downwardly-projecting rounded end 36, which is normally pressed downward by a small coil-spring 37, so that a detent 38 upon the opposite end engages with a slot or notch 39 in the hollow cylinder 30 and prevents the rotation of the cylinder 31. When the key is inserted in the slot 32, it comes in contact with the lever 35 and withdraws the detent 38 from the notch 39, as shown in Fig. 9. If, however, the key is broader than it should be, a detent 40 on the opposite side of the pivot from the detent 38 will be thrown into engagement with a notch 41 in the cylinder 30, and this prevents the cylinder 31 from being rotated. A second lever similar to the lever 35 may be pivoted in slot 42 in the side of the cylinder 31, a depression 43 being made in the key to receive the end of this lever, and thus determine the distance it will be moved. On the cylinder 31 is a collar 44, which bears against the plate 16. From the collar 44 extends an arm 45, which engages with a pin 46 on the part 20 when the cylinder 31 is rotated. The arm 45 is held in its normal position by a small coil-spring 47, which is attached at one end to the said arm and at the other to the plate 16. A small pin 48 prevents the spring from drawing the arm too far around.

Extending beyond the collar 44 is a cylindrical portion 49, at the end of which is a reduced portion 50, which rests in a suitable opening 51, Fig. 4, in the case 15, and thus forms a bearing for the cylinder 31. When the key 33 is inserted in the slot 32, a part of the said key projects below the cylindrical portion 49, as shown in Fig. 9. In this part of the key is formed a notch or notches 53, extending diagonally across the key, which when the key is rotated comes into engagement with a projection or projections 54 on the part 20. The projection 54 is curved slightly toward the front of the lock, so that the rotation of the key rotates the part 20 sufficiently to disengage the dog 25 from the stop 26, and thus allow the part 20, and with it the bolt 17, to be thrown back by the pressure of the arm 45 against the pin 46.

Projecting downwardly from the part 20 is an arm 56. The end of this arm 56 rests against an inclined face 57, Fig. 5, of a disk or cam 58. Projecting from the disk 58 to the opposite side of the lock is a cylindrical portion 59, through which and the said disk is passed an opening 60. Through the opening 60 extends a spindle 61, to which the disk 58 is keyed. The spindle 61 projects beyond the cylinder 59 sufficiently to enter an opening 62, Fig. 6, and thus forms a bearing for the disk 58. Around the spindle 61 is a collar 63, which is formed on the case 15 or secured to it in any suitable manner. Against the end of the collar 63 bears an enlarged portion 64 of the spindle 61, through which passes a handle 65, by means of which the said spindle 61 and the attached disk 58 can be rotated. Extending from the disk 58 at either end of the inclined portion 57 are projections 66 and 67. When the disk 58 is rotated, the arm 56 is forced toward the front of the lock by the inclined face 57. Thus the part 20 is rotated and the dog 25 disengaged from the stop 26, so that the bolt can be thrown back by the contact of the projection 67 with the arm 56 when the disk is further rotated. The extension 18 of the bolt 17 has a part removed from it, as shown by the dotted lines in Fig. 4, to accommodate the arm 56 and the portion of the disk 58 that projects between the said portion 18 of the bolt and the case 15. The disk 58 is held in its normal position by a spiral spring 69, one end of which is secured to the cylinder 59 and the other to the portion 18 of the bolt 17. Set in the enlarged portion 64 of the spindle 61 is a pin 70, Figs. 2 and 3, to which is attached a roughened projection 71. In the collar 63 and opposite the end of the pin 70 when the spindle 61 is in its normal position is an opening 72. The pin 70 can be brought into engagement with this opening 72 by forcing the projection 71 toward the lock, and the spindle 61 thus locked in this position. The engagement of the arm 56 with the projection 66 on the disk 58 will now prevent the bolt from being thrown back. A second opening similar to the opening 72 is formed in the collar 63 at such a point that the pin 70 can be engaged with it when the spindle is rotated to throw back the bolt, and thus lock the spindle in this position.

In order that the bolt may be forced back by its contact with the striking-plate on the door-frame, the rotary part 20 is provided with an extension 74, Figs. 4 and 10, which enters a suitable opening in the bolt 17, and terminates near the end of said bolt. The extension 74 has formed in its end a slot 75, Fig. 10, in which is secured one end of an arm 76, the other end of which projects from the bolt 17 when the rotary part 20 is in its normal position, as best shown in Fig. 1. When the bolt 17 comes in contact with the striking-plate, the arm 76 is forced in flush with the side of said bolt, as shown in Fig. 2. This rotates the part 20 sufficiently to disengage the dog 25 from the stop 26, and thus allows the bolt to be forced back by the inclined face of the striking-plate. The interior of the cavity which receives the bolt to secure the door should be provided with a suitable enlargement to allow the arm 76 to resume its normal position after the bolt has entered said cavity.

When it is desired to provide the lock with an outside knob, the cylinder 59 of the disk 58 is made shorter, as shown in Fig. 13, and seats in an opening 78 in a disk 79. The disk 79 is provided with a cylindrical projection 80, which passes through the plate 16 and engages with the shank of the outside knob. Extending from the disk 79 is a projection 81, which engages with a projection 82 on the disk 58 when the said disk 79 is rotated, and thus releases and throws the bolt. On the disk 79 is a second projection 83, extending from the periphery of said disk. The projection 83 may be made integral with the projection 81, as shown in the drawings, or separate, as desired. Above the projection 83 and journaled in the case 15 and plate 16 is a spindle 84, on which is carried a plate 85, that engages with the projection 83 and prevents the disk 79 from being rotated. On the end of the spindle and outside of the case 15 is a flattened portion or thumb-piece 86, by means of which the said spindle may be rotated. Below the projection 83 on the plate 16 is a stop 87, which prevents the disk 79 from being rotated backward. When it is desired to use the outside knob, the spindle 84 is rotated so as to bring the plate 85 in the position shown by the dotted lines in Fig. 14, thus allowing the disk 79 to be rotated by the outside knob. In this position the plate 85 rests against a stop 88 on the plate 16. When the plate 85 is in the position shown by solid lines, the disk 79 is locked against rotation and the outside knob thus thrown out of use.

When the lock is to be used as a dead-lock as well as a latch-lock, the case 15 is made larger, as shown in Fig. 15. Below the bolt 17 is a bolt 90, which is provided with an enlarged portion 91, that slides between suitable guides 92. In the enlarged portion 91 is formed a depression 93, in which the key engages to throw the bolt. Extending from the depression 93 to the front end of the enlarged portion 91 are slots 94, which may be of any suitable number. In each of these slots 94 is pivoted a lever 95, which extends back into the depression 93. The front end of each of the levers 95 is provided with an enlarged portion 96. Below the bolt 90 is a stop 97, in which are formed openings 98, which correspond to the slots 94. When the bolt is thrown forward, the levers 95 pass through the openings 98, and the enlarged portions 96 prevent the return of the bolt, the levers being pressed upward by small coil-springs 99. The key is of the ordinary type and has clefts in the end of the bit corresponding to the levers 95. These clefts are of such a depth that when the key enters the depression 93 the levers 95 will be moved just sufficiently to disengage the enlarged portions 96 from the stop 97. If the levers are moved more than this, the lower part of the enlarged portions 96 will come into engagement with the stop 97, and thus prevent the bolt from being thrown back.

100 is the outside plate of the door, in which are formed openings for the admission of the keys, and in which is revolubly secured the spindle 101 of the outside knob.

102, Fig. 4, is a conductor which extends from the front of the case 15 between the plate 16 and the dog 25, but normally out of contact with the latter. The conductor 102 is secured to a plug 103 of conducting material, which is set into the case 15, but insulated from it by a ring of hard rubber or other suitable substance. When the door is closed, the plug 103 makes contact with a rod 104, which is pressed against it by a small coil-spring 105. The rod 104 is insulated from the metallic plate 106 by a ring 107 of insulating material. To the rod 104 is attached one terminal of an electrical circuit 108, in which is included a battery 109 and a bell 110 or other suitable alarm. The other terminal of the circuit 108 is connected with the metallic plate 106, which being in contact with the case 15 and bolt 17 of the lock is through these and the rotary member 10 in electrical communication with the dog 25. When the part 20 is rotated to disengage the dog 25 from the stop 26, the said dog comes in contact with the conductor 102 and completes the circuit, and thus rings the bell.

The operation of my lock is as follows: When the key is inserted in the slot 32, the lever 35 and the corresponding lever in the slot 42 are moved in such a position that they release the cylinder 31. As the key is rotated the notch 53 in the said key engages with the projection 54 on the part 20 and rotates said part sufficiently to disengage the dog 25 from the stop 26. The arm 45 then comes in contact with the pin 46 and throws the bolt back. When the key is released, the bolt is returned to the normal position by the spring 28. When the spindle 61 is rotated by means of the handle 65, the arm 56 is forced toward the front of the lock by the inclined face 57 of the disk 58, and the dog 25 thus disengaged from the stop 26. The bolt is then thrown back by the engagement of the arm 67 on the disk 58 with the arm 56. The bolt can be locked in the desired position by forcing the pin 70 into the proper opening in the collar 63. When the bolt 17 comes in contact with the striking-plate, the arm 76 is forced in flush with the side of the bolt, and the part 20 thus rotated and the dog 25 disengaged from the stop 26. The bolt is now forced back by the beveled face on the said striking-plate. When the alarm is used, as soon as the rotary member 20 is rotated to disengage the dog 25 from the stop 26 the said dog comes in contact with the conductor 102 and completes the circuit through the said conductor, the plug 103, the rod 104, wire 108, containing the battery and bell, plate 106, bolt 17, rotary member 20, and dog 25.

Having fully described my invention, what I claim as new, and desire to secure by Letters Patent of the United States, is—

1. In a lock, a sliding bolt, a rotary member carried by said bolt, the axis of said rotary member being parallel with said bolt, dogging devices carried by said rotary member normally locking said member and thereby said bolt against longitudinal movement, and means for actuating said rotary member to disengage said dogging devices.

2. In a lock, a sliding bolt, a rotary member carried by said bolt, the axis of said rotary member being parallel with said bolt, dogging devices carried by said rotary member normally locking said member and thereby said bolt against longitudinal movement, and a key provided with means for actuating said rotary member to release said dogging devices so that said bolt may be thrown back.

3. In a lock, a sliding bolt, a rotary member carried by said bolt, the axis of said rotary member being parallel with said bolt, dogging devices carried by said rotary member, a spring normally holding said dogging devices in position to lock said bolt against longitudinal movement, and means for actuating said rotary member to disengage said dogging devices so that said bolt may be thrown back.

4. In a lock, a sliding bolt, a rotary member carried by said bolt, the axis of said rotary member being parallel with said bolt, dogging devices carried by said rotary member and normally locking said bolt against longitudinal movement, a rotary spindle, suitable actuating devices carried by said spindle for rotating said rotary member to disengage said dogging devices and for throwing said bolt.

5. In a lock, a sliding bolt, a rotary member carried by said bolt and normally locking said bolt against longitudinal movement, the axis of said rotary member being parallel with said bolt, a rotary spindle, actuating devices carried by said spindle for rotating said rotary member to release said bolt and for throwing said bolt, a spring returning said bolt to its normal position, and a spring returning said actuating devices to their normal position.

6. In a lock, a sliding bolt, a rotary member carried by said bolt and normally locking it against longitudinal movement, a movable member carried by said bolt and adapted to make contact with the striking-plate, and connections between said movable member and rotary member, whereby the contact of said movable member with the striking-plate will rotate said rotary member and release said bolt.

7. In a lock, a sliding bolt, dogging devices normally locking said bolt against longitudinal movement, a rotary spindle operated from one side of the lock, actuating devices carried by said spindle for disengaging said dogging devices and throwing said bolt, a second rotary spindle operated from the opposite side of the lock and engaging with said actuating devices, a pivotally-mounted plate locking said latter-named spindle against rotation, and means on the exterior of the lock for moving said pivotally-mounted plate to engage it with or disengage it from said latter-named spindle.

8. In a lock, a sliding bolt, pivotally-mounted dogging devices carried by said bolt and projecting in the path of the key, a stop provided with openings through which said dogging devices project, a projection on one side of each of said dogging devices normally engaging with said stop, and a projection on the other side of each of said dogging devices and engaging with said stop when the dogging devices are moved more than a predetermined distance.

9. In a lock, a non-rotary bolt, a rotary member normally locking said bolt against longitudinal movement, the axis of said rotary member being parallel with said bolt, a key provided with means for actuating said rotary member to release said bolt, a key-cylinder receiving said key and rotating with it, a device carried by said key-cylinder for throwing said bolt after it has been released by said key, a rotary spindle, and means carried by said spindle for actuating said rotary member to release said bolt and for throwing said bolt.

10. In a lock, a lock-case carried by a door, a plate of conducting material carried by the door-frame and normally in contact with the said lock-case, a suitable contact-conductor carried by said lock-case but insulated therefrom, means within said case for placing said contact-conductor in electrical communication with said case, a spring-actuated conductor normally pressing against said contact-conductor, an electric circuit connecting said spring-actuated contact and plate of conducting material, and a suitable alarm and source of electrical energy in said circuit.

In testimony whereof I have hereunto set my hand and affixed my seal in the presence of the two subscribing witnesses.

JOHN JOSEPH LINK. [L. S.]

Witnesses:
A. C. FOWLER,
E. E. VERNELL.